Figure 1:
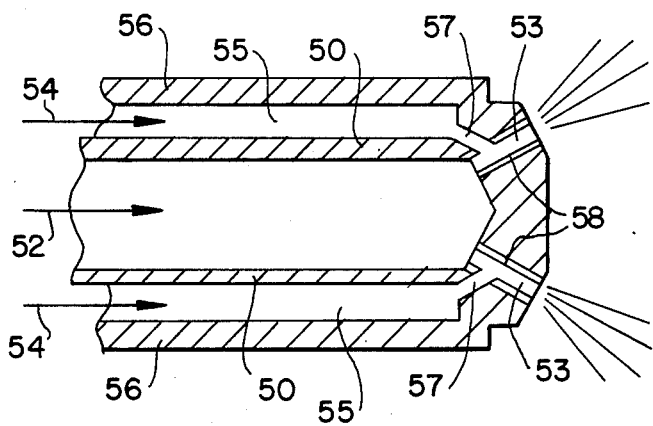

United States Patent [19]

Bailey et al.

[11] Patent Number: 4,819,878
[45] Date of Patent: Apr. 11, 1989

[54] DUAL FLUID ATOMIZER

[75] Inventors: Ralph T. Bailey, Uniontown; Robert B. Myers, Copley; Richard C. Vetterick, Akron, all of Ohio

[73] Assignee: The Babcock & Wilcox Company, New Orleans, La.

[21] Appl. No.: 73,043

[22] Filed: Jul. 14, 1987

[51] Int. Cl.⁴ .......................... B05B 7/06; B05B 7/04; B05B 1/14

[52] U.S. Cl. .................................. 239/427; 239/430; 239/433; 239/550; 239/553.3

[58] Field of Search ............... 239/427, 429, 430, 432, 239/433, 591, 550, 553, 553.3

[56] References Cited

U.S. PATENT DOCUMENTS

| | | | |
|---|---|---|---|
| 1,373,525 | 4/1921 | Payne | 239/428 |
| 2,931,580 | 4/1960 | Johnson | 239/346 |
| 3,010,660 | 11/1961 | Barrett | 239/434 |
| 3,419,220 | 12/1968 | Goodwin et al. | 239/591 |
| 3,623,669 | 11/1971 | Woods | 239/307 |
| 3,650,476 | 3/1972 | Rackley et al. | 239/431 |
| 3,712,681 | 1/1973 | Marino et al. | 302/20 |
| 3,929,290 | 12/1975 | Tallarovic | 239/417.3 |
| 4,645,129 | 2/1987 | Terrade et al. | 239/430 |
| 4,708,293 | 11/1987 | Graziadio et al. | 239/427 |

FOREIGN PATENT DOCUMENTS

| | | | |
|---|---|---|---|
| 117472 | 9/1984 | European Pat. Off. | 239/432 |
| 153949 | 4/1983 | Japan | 239/591 |
| 173309 | 10/1983 | Japan | 239/433 |

OTHER PUBLICATIONS

Dry SO₂ System and Early Operating Experience at Basin Electric's Laramie River Station, Anderson, et al., presented to A.S.M.E. Joint Power Generation Conference, Denver, Colo., Oct. 17-21, 1982; also 32rd Canadian Chemical Engineering Conference, Vancouver, B.C., Canada Oct. 3-6, 1982—entire document.
Comparison of Dry Scrubbing Operation of Laramie River and Craig Stations, Doyle, et al., Presented to Symposium on Flue Gas Desulfurization, Atlanta, Ga., Nov. 16-21, 1986—entire document.
Dry Scrubbing Eliminates Wet Sludge, Hurst, Presented to Joint Power Generation Conference, Charlotte, N.C. Oct. 7-11, 1979—entire document.
Control of SO₂ Emissions by Dry Scrubbing, Downs, et al., Presented to American Power Conference, Chicago, Ill. Apr. 21-23, 1980—entire document.
Dry Scrubber Demonstration Plant-Operating Results, Hurst, et al., Presented to EPA Symposium on Flue Gas Desulfurization, Houston, Tex., Oct. 28-31, 1980—entire document.

Primary Examiner—Andres Kashnikow
Assistant Examiner—Patrick N. Burkhart
Attorney, Agent, or Firm—Vytas R. Matas; Robert J. Edwards; Eric Marich

[57] ABSTRACT

An atomizer comprises a cylindrical mixing chamber with open entry and discharge ends. An inner barrel for a slurry or fluidized dry powder is connected to the entry end for supplying the slurry or fluidized fine powder into the mixing chamber. One or more atomizing gas ports extend at an angle into the mixing chamber for supplying atomizing gas to be thoroughly mixed with the slurry or fluidized dry powder in the mixing chamber. The atomizing gas ports are spaced upstream from the discharge end by from one to five times the diameter of the mixing chamber, and downstream from the entry end. A larger diameter volume chamber communicates with the discharge end of the mixing chamber and has at least one nozzle which permits the homogenized mixture to exit therefrom. An impact surface is positioned opposite the discharge end. The at least one nozzle is positioned around the impact surface. Critical dimensional and positional features for the mixing and volume chambers, the atomizing gas ports, and the at least one nozzle produce efficient atomized sprays even at low flow velocities for the slurry or fluidized dry powder and the atomizing gas.

10 Claims, 6 Drawing Sheets

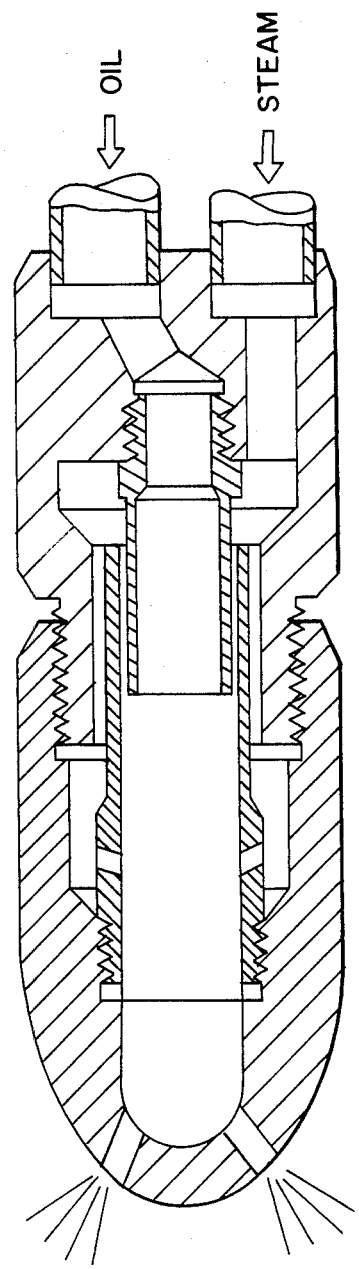
FIG. IA
PRIOR ART

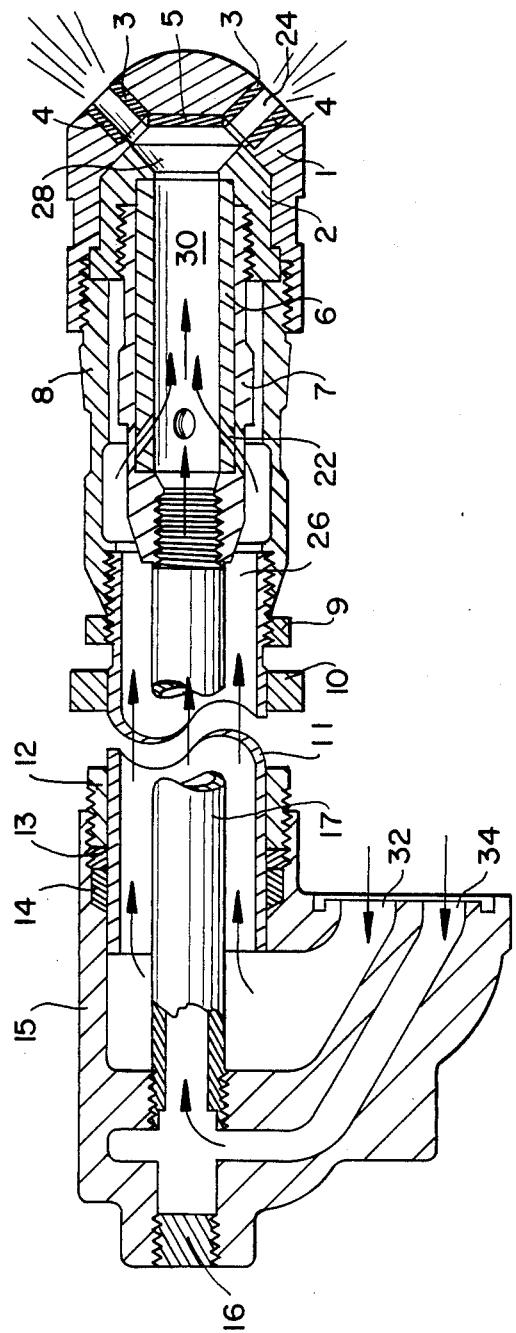

DUAL FLUID ATOMIZER

FIELD AND BACKGROUND OF THE INVENTION

The present invention relates in general to atomizers, and in particular, to a new and useful slurry atomizer which mixes together and atomizes gaseous, liquid and solid components, while having good wear resistance and good resistance to pluggage.

Several types of atomizers are known. A text which discusses atomization as it is applied to spray drying is *Spray Drying Handbook*, Third Edition, K. Masters, published in 1979 by George Godwin Limited, London, England, especially chapter 6 thereof.

Atomizers for combining liquid with a high velocity gas stream have been known for many years. U.S. Pat. No. 1,373,525 to Payne discloses an atomizer for an oil burner which has a cylindrical mixing chamber that carries a supply of air and into which oil can be introduced by obliquely extending pipes. U.S. Pat. No. 2,931,580 to Johnson discloses the use of a small mixing chamber where air and fluid are brought together. A relatively long pipe carries the mixture to a nozzle. U.S. Pat. No. 3,010,660 to Barrett discloses an atomizer for use in a snow making machine where a length of pipe carries a water-air mixture to a nozzle.

U.S. Pat. No. 3,623,669 to Woods teaches the confluence of two fluid streams and one gas stream into a chamber for discharge through a disposable nozzle which is particularly suited for spraying paints or chemicals.

U.S. Pat. No. 3,712,681 to Marino et al teaches that a slurry can be propelled by pressurized water and air, through a pipe to a discharge nozzle. The length of the pipe is specified as being from one to ten feet long.

Liquid fuel atomizers for atomizing fuel oil and the like are known from U.S. Pat. Nos. 3,650,476 to Rackley et al and 3,929,290 to Tallarovic, assigned to the same assignee as that of the present invention.

Both of these patents teach the use of a central supply tube which is supplied with one of the fluids to be combined by the atomizer. The central tube is surrounded by an outer tube which defines an annular space with the central tube. This space conveys the other of the two fluids to be combined. Near the end of the tubes, a mixing chamber is formed where the two fluids are combined at a high velocity. A cap covers the mixing chamber. Apertures through the cap provide passages for the exiting atomized spray. Neither of these references, however, teach the use of an elongated cylindrical mixing chamber where the two fluids are combined together at a critical distance from the cap.

Prior art atomizers are known which have been used in the petrochemical industry to atomize pitch containing carbon particles up to 5/16 inch diameter utilizing a central mixing chamber into which atomizing steam is injected. An example of such an atomizer is shown in FIG. 1A.

A process involving the dry scrubbing of stack gases for the removal of sulphur dioxide requires atomizers for spraying a slurry of alkaline reactants into the stack gases. The assignee of the present application, having had considerable experience with atomizers for liquid fuels, has applied this technology to the atomization of alkaline reactants for the dry scrubbing of stack gases. The atomization of a slurry having both liquid and solid granular components, poses unique problems, however.

Four technical papers presented by Babcock and Wilcox discuss the evolution of the dry scrubbing process and the use of specially designed atomizers for that process. The first of these entitled "DRY SCRUBBING ELIMINATES WET SLUDGE", by Hurst, presented Oct. 7-11, 1979 to Joint Power Generation Conference, Charlotte, N.C., discusses a demonstration plant which was built and operated using a Y-jet atomizer which was originally designed for liquid fuel. The paper entitled "CONTROL OF $SO_2$ EMISSIONS BY DRY SCRUBBING" by Downs et al, presented Apr. 21-23, 1980, to American Power Conference, Chicago, Illinois, discusses some drawbacks of the atomizers used at that time for the dry scrubbing process. "DRY SCRUBBER DEMONSTRATION PLANT - OPERATING RESULTS", by Hurst et al, presented Oct. 28-31, 1980, to EPA Symposium on Flue Gas Desulfurization, Houston, Texas, discloses performance of the dry scrubbing process utilizing atomized slurry. "DRY $SO_2$ SYSTEM DESIGN IN EARLY OPERATING EXPERIENCE AT BASIN ELECTRIC's LARAMIE RIVER STATION", by Anderson et al, presented Oct. 3-6, 1982, to Thirty-second Canadian Conference, Vancouver, British Columbia, Canada, discloses details of the flue gas distributer structure used around the atomizing nozzle for the dry scrubbing process. Finally a paper entitled "COMPARISON OF DRY SCRUBBING OPERATION OF LARAMIE RIVER AND CRAIG STATIONS", by Doyle et al, presented Nov. 16-21, 1986 to Symposium on Flue Gas Desulfurization, Atlanta, Georgia, describes two commercially operating dry sulfur removal (DSR) systems in which the present invention (as described on page 2 and in FIG. 4 thereof) has successfully operated to provide superior atomization while reducing pluggage potential, enhancing the operation of the DSR units.

In general, dual fluid atomizers can be sub-divided on the basis of location where the gas and liquid components are mixed together. An external mix dual fluid atomizer passes the gas and liquid streams through separate flow passages inside the atomizer. The two fluids are mixed together externally of the atomizer hardware by impinging jets of the two fluids against each other. An internal mix dual fluid atomizer mixes the fluids internally of the atomizer hardware and discharges them through a common flow passage.

When a liquid which is ladened with suspended solid particles (a slurry) is to be atomized, the choice of atomizer is limited by practical constraints. These constraints include flow capacity, the required size of droplets in the atomized spray, the size of the flow passages to pass the particles in the slurry, the physical durability of the atomizer parts, the sensitivity of the quality of the atomized spray to component dimensional changes, and commercially acceptable energy requirements to produce the atomized spray.

The atomizers disclosed in Rackley et al, and Tallarovic, identified above, are of the dual fluid internal mix type. These atomizer designs provide the finest droplets. They utilize a gaseous atomizing medium, such as air or steam, which is accelerated through a small diameter passage to establish a high velocity. The high velocity gas is mixed with the fluid, and the gas/fluid mixture is discharged through a flow passage as an atomized spray. The atomizer disclosed by Rackley et al is commonly referred to as the T-jet type. The slurry atomizers disclosed in the technical papers identified above, are commonly referred to as Y-jet atomizers. Slurry is sent through a central tube to a nozzle head having diverging nozzle passages. Air or steam is sent through an annular chamber around the central tube to entry ports in the nozzle passages positioned just downstream of the passage entry for the slurry. Up until now, the largest discharge port size that has been successfully tested is in the range of 0.1935 inches in diameter while the most consistent performance utilizes port sizes of only 0.1540 inches in diameter.

This limitation on port sizes lead to clogging problems. Atomization was poor in general and the wear rates were excessive, due to the highly abrasive properties of the slurry.

In response to these problems, the present inventors had designed an atomizer using discharge nozzles attached by a nine or ten foot barrel to a dual fluid mixing chamber, located at the opposite end. Problems in this design were also noted in the field, however. In particular, atomization was poor due to an inadvertent separation of the slurry. The slurry apparently became separated during its passage along the barrel from the rear mixing chamber to the nozzles located at the opposite end. The upwardly pointed nozzles produced extremely fine spray droplet sizes while the downwardly pointing nozzles had large droplet sizes which were unacceptable. Since droplet size is extremely important in dry scrubbing applications, and the desired droplet size is extremely small, in the range of 75–80 micrometers (75–80 millionths of a meter) mass median diameter or better, an atomizer design which had high capacity, fine atomization, and low energy requirements was needed.

SUMMARY OF THE INVENTION

The present invention comprises a dual fluid atomizer which produces efficient and consistent atomized sprays, is not susceptible to pluggage, and has an acceptable wear life.

The atomizer of the present invention is of the dual fluid type. One unique characteristic of the invention is in the use of large size flow passages and in their arrangement. The large passageways allow the utilization of low fluid velocities, thus reducing pressure requirements. This also allows the passage of grit particles without clogging and at the same time produces fine atomization of the liquid fraction. The dual fluid atomizer of the present invention can be described as a 3-phase atomizer in that a gas, a liquid and a solid can pass through concurrently. The invention produces a fine mist of liquid and a uniform distribution of solid particles, or in cases where liquid is not utilized, (such as a powder fluidized in a gas) the invention produces a fine and uniform distribution of powder particles. The use of low velocities also reduces wear by minimizing erosion. High velocities are utilized only at the exit ports of the nozzles where the atomized spray is formed.

Critical dimensional and positional parameters are observed to provide maximum efficiency in the formation of the atomized spray, while minimizing wear and tendency for pluggage.

Accordingly, one aspect of the present invention is to provide an atomizer which has the same or larger slurry capacity than prior art atomizers, while using atomization gas and fluid flows at lower supply pressures. The inventive atomizer still provides quality atomization despite the savings in energy and wear. Larger flow areas are utilized to reduce the velocities inside the atomizer and thus reduce unrecoverable pressure loss.

These advantages are commercially significant since they provide higher capacity ranges at lower energy and lower maintenance costs. Cleaning and inspection is required less frequently for the present invention since the inventive atomizer is not susceptible to clogging and pluggage. This is because of the lack of tortuous flowpaths inside the atomizer and the use of large flow areas as indicated above.

Quality atomization is achieved with 30–80 psi atomizing gas pressure (compressed air or steam) and 10–60 psi fluid pressure. This permits the use of lower power compressors and pumps, representing another savings.

The fact that higher capacities can be achieved with the inventive atomizer means that fewer atomizers are required for a given process. This is particularly useful in dry scrubbers where fewer atomizers represent an additional cost savings both in hardware and maintenance.

BRIEF DESCRIPTION OF THE DRAWINGS

In the drawings:

FIG. 1 is an axial sectional view showing the head and nozzle area of a prior art Y-jet type atomizer;

FIG. 1A is an axial sectional view showing the head and nozzle area of a second type of prior art atomizer.

FIG. 2 is an axial sectional view of the atomizer in accordance with the present invention;

FIG. 3 is an enlarged sectional view showing the head and nozzle area of the inventive atomizer;

FIG. 4 is a graph showing atomization pressure versus flow for the present invention and two prior art atomizers; and FIG. 5 is a graph showing mass median diameter of the atomized droplets (micrometers) versus air-to-water flow ratio for the present invention and two prior art atomizers.

DESCRIPTION OF THE PREFERRED EMBODIMENT

Referring to FIGS. 2 and 3 in particular, the invention embodied therein comprises an atomizer which is particularly suited for atomizing a slurry of liquid borne particles, or a fluid of gas borne dry powder particles, with an atomizing gas such as air or steam.

A prior art atomizer known as the Y-jet atomizer is shown schematically in FIG. 1. This atomizer comprises an inner barrel 50 for conveying a flow 52 of slurry to a plurality of atomizing nozzles 53. The atomizing gas such as air or steam shown at 54, flows in an annular passage 55 defined between the inner barrel 50 and an outer barrel 56. The atomizing air is supplied through angled air passages 57 into the base of the nozzles 53.

For efficient atomization, an upper limit for the inside diameter of nozzles 53 in this prior art atomizer has been found to be about 0.1935 inches, which is equivalent to a #10 twist drill size. This relatively small diameter, in addition to the even smaller diameter for the air passages 57, makes the Y-jet atomizer quite susceptible to clogging and pluggage when a slurry is involved. High velocities are used to obtain proper atomization, however, high velocities means that the internal parts of the atomizer are especially susceptible to wear. One measure which was taken to locally reduce wear was to line the nozzle 53 with wear resistant inserts 58. This however, does not solve the clogging problem nor does it in any way reduce the energy requirements for the prior art atomizer.

It is noted that, in practice, the atomizer of FIG. 1 is actually made of multiple parts which are threaded together rather than the single part shown.

Returning now to FIG. 2, the atomizer of the present invention comprises an end cap 1 which carries a plurality of discharge nozzles 24, each having a wear resistant insert or liner 4 which is retained by a threaded retainer 3, threaded into the end cap 1. The interior of the end cap 1 is hollowed to partially form a volume chamber 28 which is bounded at its sides by a sprayer head 2.

End cap 1 also carries a wear resistant pad 5.

A mixing chamber housing 7 is threaded into the sprayer head 2 and defines an interior cylindrical mixing chamber 30 which is lined by a wear sleeve or insert 6. Chamber 30 has opposite open ends. The left hand end communicates with the open end of an inner barrel 17 which carries slurry or fluidized dry powder into chamber 30. The opposite right hand end of chamber 30 communicates with the volume chamber 28.

The nozzle inserts 4, the wear pad 5, and the wear sleeve 6 are advantageously made of wear resistant materials, such as ceramics or hardened steel. Silicon carbide is an example of one such ceramic material. It should be noted however, that the selection of the particular material (i.e. hardened steel alloys or ceramics) for any of the wear resistant elements (4,5, and 6) is based entirely on its intended use and application.

To reduce manufacturing costs the wear resistant elements 4, 5, and 6, if made of ceramic materials, may be advantageously coated with a castable material such as rubber, to ease manufacturing tolerances and machining requirements as needed. Typical as-manufactured tolerances for ceramic wear materials generally are in the range of $\pm 1/32$ inches. Those rubber coated, wear resistant surfaces in direct contact with the homogenized slurry will have their rubber coatings quickly removed when the atomizer is in use.

Atomizing gas ports 22 extend through housing 7 and wear sleeve 6 into chamber 30. Advantageously, four evenly distributed gas ports 22 are utilized around the circumference of the wear sleeve 6. An adapter coupling 8 surrounds and is spaced outwardly from the mixing chamber housing 7 to define an annular space for the flow of atomizing gas, such as air or steam. Adapter coupling 8 is threaded into end cap 1 and has a shoulder for retaining head 2 against an inner surface of end cap 1.

The opposite end of adapter coupling 8 is threaded onto an outer barrel 11. A lock nut 9 fixes the position of adapter coupling 8 on outer barrel 11. A split ring collar 10 extends around outer barrel 11 and is used for supporting the outer end of the atomizer.

The inner end of the atomizer (to the left in FIG. 2), comprises an atomizer body 15 which has passages therein for the slurry (or fluidized dry powder) and for the atomizing gas.

Atomizing gas is admitted through entrance port 32 into the atomizer body 15 and the slurry or fluidized dry powder is admitted through entrance port 34 into the atomizer body 15.

An axial passage through the atomizer body 15 is closed at the left by a pipe plug 16 and has threads at the right for receiving one threaded end of the inner barrel 17. The opposite threaded end of the barrel 17 is threaded into mixing chamber housing 7.

An annular gas passage 26 communicates with port 32 and is defined between inner and outer barrels 17, 11 respectively.

Outer barrel 11 is held in a receiving bore of atomizer body 15 by mechanical packing 14 which is compressed by a follower ring 13 and a packing gland 12 threaded into the open end of the atomizer body 15.

The flow passages, ports and nozzles of the present invention have relatively large flow areas. In particular, nozzle 24 inside diameters of ½ inch have been used successfully while still achieving good atomization. Slurry or fluidized dry powder, at relatively low velocities, is supplied to port 34, through inner barrel 17 and into the inlet end of chamber 30. Here, the slurry or fluidized dry powder is homogenized with the atomizing gas supplied through ports 22, from annular passage 26 and port 32.

The homogenized mixture of atomizing gas and slurry (or fluidized dry powder) moves axially through cylindrical chamber 30 and impacts against wear pad 5. The homogenized mixture then passes through discharge nozzles 24 and is subjected to rapid expansion which produces a fine droplet/particle atomization.

Oversized particles that are contained in the slurry for whatever reason, can flow easily through the relatively large atomizing nozzles 24 without obstruction. Despite this, the liquid fraction is finely atomized into small particles which are typical of the dual fluid Y-jet atomizer. In actual tests, nozzles 24 having inside diameters of ½ inch (over 6½ times larger than prior art nozzles) have successfully produced atomized sprays of high quality.

Poor atomization due to clogging is virtually eliminated by the unique arrangement of the atomizing gas ports 22 that all communicate with the mixing chamber 30, and by the single large open end of the mixing chamber inlet end allowing for an un-restricted flow path for the slurry. The atomizing gas ports 22 are sized such that gas velocity is well below sonic velocity (that velocity at which the sound waves restrict the gas flow). Should any atomizing gas port 22 become clogged the atomizing gas will redistribute through the remaining gas ports 22 allowing the homogenized mixture in the mixing chamber 30 to maintain proper proportions of fluid and gas for all of the mixture.

In the present invention, high velocity jets of atomizing gas are not required for staged atomization in order to ultimately achieve high capacity, fine atomization of the fluid. It has been discovered that the requirement of the initial mixing is to develop a uniform and thoroughly homogenous fluid from which fine atomization is achieved by rapid expansion across the discharge nozzles. Further, once the two fluids are thoroughly, uniformly and homogenously mixed, it is important not to allow separation to occur, nor to allow stagnant volumes which allow phase separation by gravity.

For the present invention to operate properly, however, certain critical dimensional relationships should be observed.

Turning to FIG. 3, the cylindrical mixing chamber 30 should have a discharge end 31 which is adjacent to the volume chamber 28. This is shown at dimension A in FIG. 3. A value of A =0.25 inches, chosen solely to facilitate the mechanical design, has been shown to be acceptable. The surface of the wear pad 5 preferably extends substantially perpendicular to the axis 40 of chamber 30 (which is also the direction of flow for the resulting homogenized mixture).

The distance between discharge opening 31 and the striking surface of wear pad 5 should be from one to three times the inside diameter of mixing chamber 30. This inside diameter is shown at D in FIG. 3.

The atomizing gas ports 22 are located such that detrimental phase separation of the homogeneous mixture does not occur prior to discharge from the chamber 30 into the volume chamber 28. Acceptable results can be achieved when the atomizing gas ports 22 are positioned from one to five times D upstream of the discharge end 31 of chamber 30. Ports 22 can either be one or more holes as shown (and preferably 4 holes) or may be in the form of one or more openings or flow passages into chamber 30.

The angle B which the axis of ports 22 make with the axis 40 of chamber 30, can range from 10 degrees to 170 degrees, the particular angle B chosen such that thorough mixing is achieved without excessive pressure drop. Satisfactory results have been achieved with four (4) ports at an angle B of 45 degrees.

The total cross sectional area of the ports 22 should be selected so that a velocity of from 100 to 500 ft/sec, for the atomizing gas is obtained.

The slurry inlet 33 of chamber 30, as well as the discharge end 31, extend along the center line or axis of chamber 30. The slurry inlet 33 is preferably located upstream of the atomizing gas ports 22, but this is not necessary in the practice of the present invention. The size of the slurry inlet 33 must be selected so that fluid velocity is within the range of 0.5 to 29.5 ft/sec.

The mixing chamber inside diameter D is selected to keep the homogenized mixture in the velocity range of 100 to 300 ft/sec.

The size and number of discharge nozzles 24 is adjusted to meet capacity requirements. The number and arrangement of the outlets of the nozzles 24 are set to meet designers' needs. Location of an entrance end 25 of each of the nozzles 24, however, is critical in relation to the mixing chamber discharge. The diameter of a circle centered on and substantially perpendicular to the axis 40 and encompassing center lines of the entrance end 25 of the nozzles 24, must be greater than the combined sum of one D, but no more than three D, plus the diameter of one discharge nozzle 24. This places the entrance end 25 of each of the nozzles 24, outside the periphery of discharge end 31 of mixing chamber 30. The location of the wear pad 5 with respect to the entrance end 25 of the nozzles 24 is chosen so that good atomization is achieved.

The shape of the sprayer head 2 is also important. The inside surface of sprayer head 2 which partially defines chamber 28 (and is shown as being conical in FIG. 3) should intersect the inside surface of end cap 1 at a tangential circle 36 which encompasses the outside edge of the inlet openings 25 for nozzles 24. This circle of intersection 36 must be within 0.25 inches of the outer edge of the inlet openings 25, however, to prevent local segregation of the mixture which can result in poor atomization.

Figure 3:
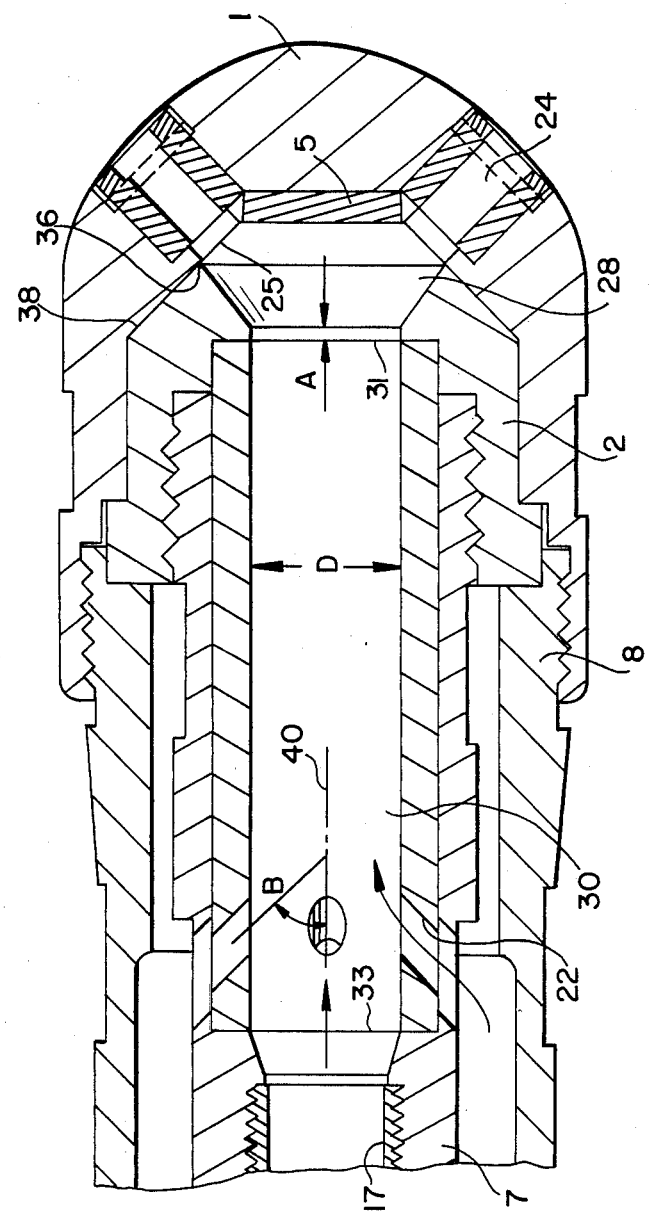

The mating tapered outside surfaces of head 2 and cap 1 which are shown at 38 in FIG. 3, should be accurate to within ±½ degree to seal the end cap 1 to the sprayer head 2.

The volume chamber 28 is further limited in diameter to minimize stagnant zones which lead to phase separation of the homogenized mixture. The radius of chamber 28 from axis 40 to an outermost region of the chamber should be no greater than two D. D again is the inside diameter of cylindrical chamber 30.

By observing some or all of the foregoing critical features, improved atomization is achieved over the prior art atomizers.

Figure 4:
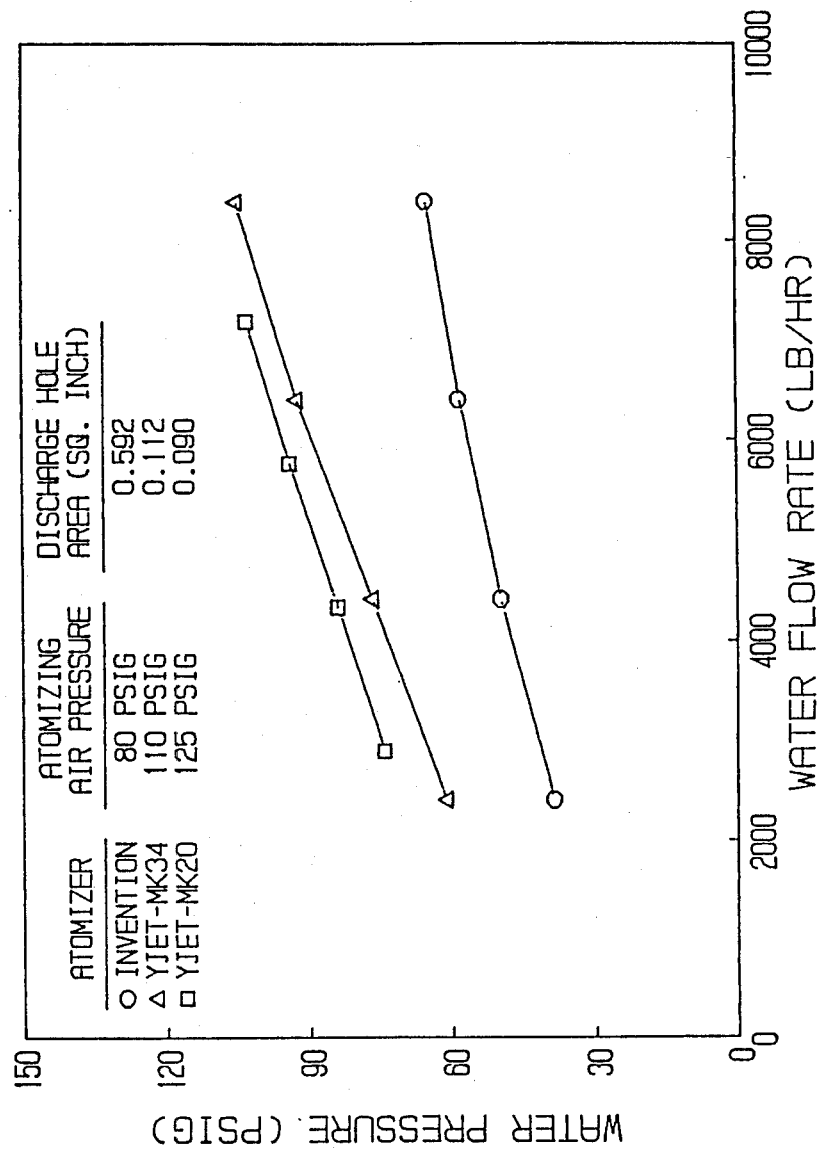

FIG. 4 shows test results where all of the critical features were met for the atomizer according to the present invention. FIG. 4 is a graph relating the atomization pressures to flow and shows the results of the present invention by circles. Two versions of a Y-jet atomizer (designated MK34 and MK20) are also shown at points designated with triangles and squares respectively.

The prior art designs require an atomizing gas supply pressure of 110 or 125 psi., while the present invention requires only 80 psi. This represents a reduction of 30 or 45 psi. Also, at a flow rate of 7,200 lbs/hour, the fluid supply pressure is 95 or 104 psi. in the prior art. According to the present invention, only 60 psi. is needed, at this flow rate, a reduction of 30 or 44 psi.

Figure 5:
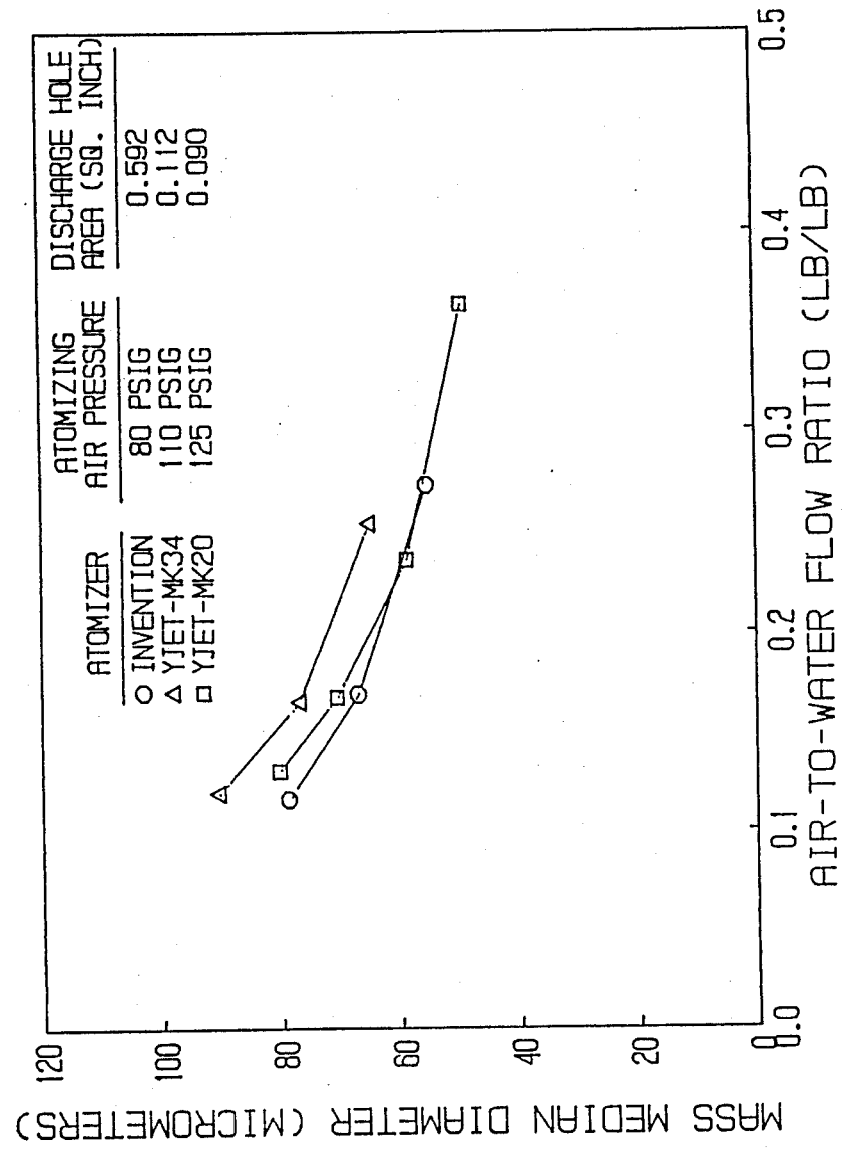

According to the present invention, an atomizing gas pressure drop of only about 20 to 25 psi is produced across the cylindrical chamber 30. The balance of the pressure drop is "saved" so that it can be used at the nozzles 24 to insure good atomization. A pressure drop of only about 55 psi is utilized across the nozzles 24. This relatively low loss of pressure represents an energy savings. This is significant in view of the fact that the quality of the atomized spray is retained or even exceeded with respect to the prior art, as is shown in FIG. 5. In addition, and with further reference to FIG. 5, the invention achieves the same or better atomization (as measured by mass median diameter of the droplets) at the same gas to liquid ratio (pound per pound) which represents an important energy savings.

It is noted that the supply of atomizing gas and slurry (or fluidized dry powder) can be reversed to ports 32 and 34 if desired. The wear elements 4, 5 and 6 can also be made as one part with the end cap, and housing structures.

The present invention thoroughly mixes the two fluids to achieve a homogenized mixture utilizing low pressure drop (and consequently lower energy requirements) and maintains a homogenized mixture throughout the atomizing process. This is in contrast to other prior art atomizing assemblies such as the Y-jet or T-jet.

In both the Y-Jet and T-Jet designs, high velocities in the mixing region were used for the first stage atomization of the two fluids, which, for a given capacity, required a plurality of small ports. As was previously indicated, problems with pluggage and capacity were encountered. As port size was increased to overcome these problems, the thoroughness of mixing of the two fluids deteriorated, resulting in poor atomization quality and uniformity.

It has been found that good homogenization is a prerequisite for good atomization. The present invention is successful in achieving thorough homogenization at lower velocities and pressure drop than the prior art assemblies, due to the unique geometrical configuration of the apparatus. Further, since the present invention can achieve thorough mixing at low velocities and still achieve high capacities, the invention is relatively insensitive to dimensional variations due to manufacturing tolerances or wear.

While a specific embodiment of the invention has been shown and described in detail to describe the application of the principles of the invention, it will be understood that the invention may be embodied otherwise without departing from such principles. For example, several rows of nozzles 24 can be placed in the sprayer head 2, arranged in a symmetrical or asymmetrical pattern.

What is claimed is:

1. An atomizer for mixing together and atomizing at least two fluids, comprising:

a mixing chamber housing defining a mixing chamber with an open entry end and an open discharge end, said mixing chamber having an axis and an inside diameter, one of the fluids being supplied to said entry end, said mixing chamber housing having at least one entry port for admitting the other fluid into said mixing chamber, said entry port extending toward said axis of said mixing chamber at an angle and being spaced upstream from said discharge end and downstream of said entry end with respect to a flow of the first fluid along said axis;

a volume chamber communicating with and adjacent to said discharge end of said mixing chamber, said volume chamber having a diameter which is larger than said mixing chamber inside diameter, said volume chamber being defined by a spray head engaged around said discharge end of said mixing chamber and having a conical inner surface defining part of said volume chamber, and an end cap having a conical recess therein defining another part of said volume chamber and engaged over said spray head and having at least one atomizing nozzle having an entry end communicating with said volume chamber and being disposed outside a periphery of said mixing chamber discharge end, said entry end of said at least one nozzle having a center point lying outboard of a circle centered on said axis, the diameter of said circle being larger than the sum of said mixing chamber inside diameter, plus the inside diameter of said at least one nozzle, said spray head conical inside surface intersecting the inside surface of said end cap at a tangential circle which encompasses the outside edge of the entry end of said at least one nozzle by a tolerance of up to 0.25 inches; and whereby the first and second fluids are mixed together in said mixing chamber to form a thoroughly homogenized mixture, the mixture passing into said volume chamber and being impacted against an impact surface defined on said end cap in said recess extending substantially perpendicular with respect to said axis, said impact surface being on a side of said volume chamber opposite said discharge end of said mixing chamber, and is atomized through said at least one nozzle, said impact surface being spaced from said discharge end by an amount equal to about one to three times the inside diameter of said mixing chamber.

2. An atomizer according to claim 1 wherein the angle at which said at least one entry port extends towards the axis of the mixing chamber is from 10 to 170 degrees.

3. An atomizer according to claim 2 wherein said at least one entry port is spaced upstream from said discharge end of said mixing chamber at a distance sufficient to prevent detrimental phase separation of the homogenized mixture constituents.

4. An atomizer according to claim 1 including a wear pad connected to said end cap and carrying said impact surface.

5. An atomizer according to claim 1 including a wear insert lining said at least one nozzle.

6. An atomizer according to claim 1 including an inner barrel for conveying one of the fluids connected to said entry end of said mixing chamber, and an outer barrel connected to said mixing chamber housing and defining an annular space with said inner barrel for conveying the other fluid, said annular space communicating with said at least one entry port for supplying the other fluid into said mixing chamber.

7. An atomizer according to claim 1 wherein said spray head and said end cap have tapering mating surfaces which match each other to within ±½ of a degree to seal said end cap to said spray head to close said volume chamber.

8. An atomizer according to claim 1 including from one to four entry ports extending into said mixing chamber, the size of said entry ports being selected to establish a flow velocity of the atomizing fluid through said entry ports within the range of 100 to 500 ft/sec, said entry end of said mixing chamber having a diameter selected to permit a flow velocity of the other fluid of from 0.5 to 29.5 ft/sec, said mixing chamber being cylindrical and said inside diameter of said mixing chamber being selected so that a homogenized mixture of the two fluids moves through said mixing chamber at a velocity of about 100 to 300 ft/sec.

9. An atomizer according to claim 1 wherein said at least one entry port is spaced upstream from said discharge end of said mixing chamber by from one to five times the inside diameter of said mixing chamber.

10. An atomizer comprising: a housing defining a cylindrical mixing chamber having an inside diameter, an open entry end for a slurry or fluidized dry powder, and an open discharge end, said housing having a plurality of ports extending at an angle of 45 degrees with respect to an axis of said mixing chamber into said mixing chamber, said ports being spaced upstream of said discharge end by from one to five times the inside diameter of said mixing chamber and being spaced downstream of said entry end, a spray head engaged around said discharge end and having a conical inner surface partially defining a volume chamber having a diameter which is larger than said mixing chamber diameter communicating with said discharge end, and an end cap having a conical recess therein engaged over said spray head for enclosing said volume chamber, said cap having a plurality of nozzles extending therethrough, said nozzles communicating with said volume chamber, said end cap having an impact surface around which said nozzles are distributed, said impact surface being spaced from said discharge end by at least one mixing chamber diameter and extending substantially perpendicular to said axis of said mixing chamber, wherein each of said nozzles has an entry end with a center, said centers of said nozzles lying outboard of a circle having a diameter at least equal to the inside diameter of said mixing chamber, plus an inside diameter of one of said nozzles; and wherein said spray head conical inner surface has a tangential circle of intersection with said end cap recess, which at least encompasses outer edges of said entry ends of said nozzles.

* * * * *